(12) United States Patent
Doornbos et al.

(10) Patent No.: US 6,968,929 B2
(45) Date of Patent: Nov. 29, 2005

(54) DAMPER

(75) Inventors: David A. Doornbos, Manteno, IL (US); Steven L. Bivens, Kankakee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 17 days.

(21) Appl. No.: 10/824,512

(22) Filed: Apr. 14, 2004

(65) Prior Publication Data

US 2004/0226789 A1 Nov. 18, 2004

Related U.S. Application Data

(60) Provisional application No. 60/462,999, filed on Apr. 15, 2003.

(51) Int. Cl.[7] ............................ F16D 57/00; F16F 11/00
(52) U.S. Cl. ....................................... 188/290; 188/322.5
(58) Field of Search ............................. 188/290, 322.5, 188/83, 293, 294

(56) References Cited

U.S. PATENT DOCUMENTS

| | | | |
|---|---|---|---|
| 4,468,836 A | 9/1984 | Omata | 16/82 |
| 4,527,675 A | 7/1985 | Omata et al. | 188/290 |
| 4,550,470 A | 11/1985 | Omata | 16/85 |
| 4,576,252 A | 3/1986 | Omata | 185/39 |
| 4,614,004 A | 9/1986 | Oshida | 16/82 |
| 4,638,528 A | 1/1987 | Omata | 16/82 |
| 4,653,616 A * | 3/1987 | Mizusawa | 188/290 |
| 4,691,589 A * | 9/1987 | Arakawa | 74/574 |
| 4,697,673 A | 10/1987 | Omata | 188/291 |
| 4,773,242 A | 9/1988 | Smith | 70/455 |
| 4,869,125 A * | 9/1989 | Saigusa | 188/290 |
| 4,908,905 A | 3/1990 | Kanno et al. | 16/82 |
| 5,211,267 A | 5/1993 | Clark | 188/276 |
| 5,403,058 A | 4/1995 | Fischer | 296/37.7 |
| 5,522,485 A | 6/1996 | Takahashi et al. | 188/306 |
| 5,718,309 A | 2/1998 | Kariya | 188/290 |
| 6,041,899 A * | 3/2000 | Takamatsu | 188/290 |
| 6,298,960 B1 | 10/2001 | Derr | 188/290 |
| 6,604,614 B2 * | 8/2003 | Kurihara et al. | 188/290 |
| D479,242 S * | 9/2003 | Kurachi et al. | D14/483 |
| 6,729,447 B2 * | 5/2004 | Takahashi | 188/293 |

FOREIGN PATENT DOCUMENTS

| DE | 41 19 090 A1 * | 6/1991 |
|---|---|---|
| JP | 62-184246 | 8/1987 |
| JP | 62-184247 | 8/1987 |

* cited by examiner

*Primary Examiner*—Thomas Williams
(74) *Attorney, Agent, or Firm*—Mark W. Croll; Paul F. Donovan

(57) ABSTRACT

A gear damper has a fixed first part and a second part rotatable relative thereto, with a gear formed on the second part. A continuous annular seal is provided between the first and second parts, and a substantially continuous layer of damping fluid is provided between the first and second parts.

12 Claims, 2 Drawing Sheets

DAMPER

CROSS-REFERENCE TO RELATED APPLICATIONS

The present application claims the benefits of U.S. Provisional Application Ser. No. 60/462,999 filed on Apr. 15, 2003.

FIELD OF THE INVENTION

The present invention pertains to movement damping devices, and particularly to low profile gear dampers having viscous fluid in a chamber for controlling rotation of gear engaged with a device.

BACKGROUND OF THE INVENTION

It is known to use movement dampers in a variety of assemblies to control the movement of assembly components. For example, in furniture and cabinetry it is known to use dampers for controlling movement of a drawer or a door in at least one direction. In automobiles, it is known to use dampers on glove box and counsel doors and the like. Other uses also are known.

In a known damper design, resistance to movement of a gear on a mechanism, such as an automatic closer, is provided through driving engagement between the gear of the mechanism and a gear of the damper. A rack and pinion relationship can be provided between the mechanism and damper, respectively. Resistance to rotation of the gear on the damper, which is inherent in the structure of the damper, is thereby imparted to movement of the mechanism gear, for controlling operation of the mechanism. Such damping devices are frequently referred to as gear dampers.

A gear damper is known to include a rotor rotatably held in a housing. Damping fluid in the housing around the rotor is contained by the housing, a cap and o-ring seals. A gear is attached to the rotor externally of the hosing, and the gear is drivingly connected to the gear of the mechanism for which movement control is desired.

Dampers of this type, which may include five or more separate components, are relatively expensive to manufacture and assemble. Adequate sealing is essential for continued effective operation of the damper in that if some damping fluid is allowed to leak from the housing, the damping performance of the damper is compromised. Snap together dampers are known, but have used complex labyrinth designs with pluralities of interesting concentric rings on the snap together components to contain the damping fluid. The snap features have been discontinuous about the periphery of the rotating component. Even with the complex designs, snap together dampers have been known to leak, and welding of the parts has been used to minimize the potential for leakage. Welding increases the cost to manufacture the dampers, and when the cap is made stationary by welding to the housing base, a rotor through the cap is required to support the turning gear. Seals such as o-rings are required to seal the rotor and housing interface, which add to the complexity of assembling the damper and create a source of potential leakage and wear. With the gear supported only centrally by the rotor shaft, deflection of the gear can result also from unequal internal forces from damping fluid and internal structures, such as the rotor turning therein.

Multi-component dampers, with plastic gears fitted on rotor shafts, are subject to operationally difficulties if the damper or structures to which the damper is connected becoming slightly improperly positioned. Forces against the damper can cause the gear to deflect, impacting performance and causing premature wear of the gear.

What is needed in the art is a low cost damper that is easy to assemble and reliable in performance.

SUMMARY OF THE INVENTION

The present invention provides a gear damper with two structural components, a housing and rotatable cover snap fit onto the housing to compress a non-migrating damping grease within a space defined between the housing and cover.

In one form thereof, the present invention provides a damper with a first part having a base and a wall extending outwardly from the base and defining a space having an open end; and a second part rotatably secured to the first part and closing the open end. The second part includes a cover and a rim at the periphery thereof. One of the wall and the rim includes a radially extending lip. The other of the wall and the rim defines a recess for receiving the lip and defines a continuous edge for engaging the lip. Damping fluid is compressed in the space between the first and second parts and is contained therein by a seal formed by the edge against the lip.

In another form thereof, the present invention provides a damper with a fixed first part and a rotatable second part secured to the first part. The first and second parts defining radially overlapping structures having substantially continuous circumferential engagement over a limited radial width when placed under axial force in opposite directions. Damping fluid under compression within a substantially continuous space between the first and second parts is radially confined by the substantially continuous circumferential engagement.

In still another form thereof, the present invention provides a gear damper with a fixed first part and a second part rotatable relative to the first part. The second part has a cover, a gear integral with the cover and an outer rim. The first and second parts defining a continuous sliding seal of limited radial width. A continuous layer of damping fluid is contained between the first and second parts and radially constrained by the seal.

An advantage of the present invention is providing a viscous damper that can be assembled easily and consistently, and at reduced cost for manufacture and assembly as compared with more complex dampers.

Another advantage of the present invention is providing a damper having a minimal number of parts.

Still another advantage of the present invention is providing a damper that is robust with a securely located external gear not subject to bending or deflection under common conditions of use.

Other features and advantages of the invention will become apparent to those skilled in the art upon review of the following detailed description, claims and drawings in which like numerals are used to designate like features.

Figure 1:
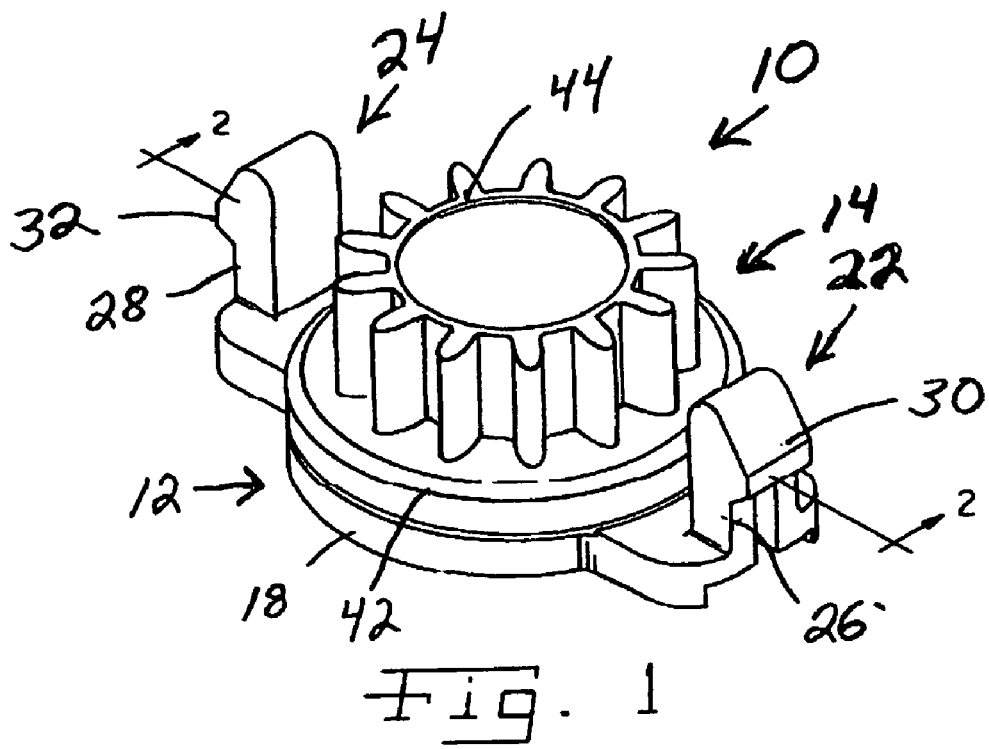
FIG. 1 is perspective view of a damper in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a damper of the present invention, which can be used for controlling the movement of a device (not shown), which may be a drawer slide, a door closer or the like, in appliances, furniture, automobiles or other devices. It is anticipated that damper 10 of the present invention will have a wide range of uses and applications, and should not be interpreted as being limited to the few applications and uses provided as examples herein.

Damper 10 includes a first part 12 and a second part 14 which connect to each other in the assembled damper 10. In the assembled configuration, first part 12 and second part 14 define a limited space therebetween for containing a damping fluid 16, such as non-migrating grease. First part 12 and second part 14 are cooperatively configured for interlocking one with another in a snap-fit arrangement whereby damping fluid 16 is contained within the space between first part 12 and second part 14, yet second part 14 is allowed to rotate relative to firstpart 12.

First part 12 includes a base 18 and a cylindrical wall 20 extending outwardly from base 18. Base 18 is provided at one end of wall 20, with the other end of wall 20 being open and configured for engaging second part 14, as will be described more fully hereinafter. Base 18 and wall 20 thereby define an open volume in first part 12.

One or more tabs or fixtures 22, 24 can be provided on first part 12, two such fixtures 22, 24 being shown in the drawings. Fixtures 22, 24 are provided for attaching damper 10 to the device on which it is used. In the exemplary embodiment illustrated, fixtures 22, 24 include legs 26, 28 and engaging tabs 30, 32, respectively, by which damper 10 can be attached by snap fit engagement within slots or holes defined in the apparatus (not shown). Those skilled in the art will understand readily that other structure and devices for attaching damper 10 can be used, including flanges having holes therein for receiving screws, bolts, nails, rivets or the like. Other mechanical fasteners or bonding agents such as adhesive also can be used for attaching damper 10 as required.

An inward protrusion 34 from base 18 is provided centrally located within the open volume defined by wall 20.

First part 12, including base 18, wall 20, fixtures 22, 24 and protrusion 34 is formed as a monolithic structure of plastic or the like by known molding techniques.

Second part 14 includes a cover 42 configured for engaging wall 20 to close the open end thereof, and a gear 44 by which damper 10 is operatively engaged with the device upon which it operates. Thus, gear 44 can engage another gear (not shown), which may be a rack of the device. Cover 42 defines a dome 46 configured for receiving protrusion 34 therein, substantially locating and centering second part 14 with respect to cylindrical wall 20 of first part 12 when first part 12 and second part 14 are assembled together.

Second part 14, including cover 42, gear 44 and dome 46, also is formed as a monolithic structure of plastic or the like by known molding techniques.

Figure 3:
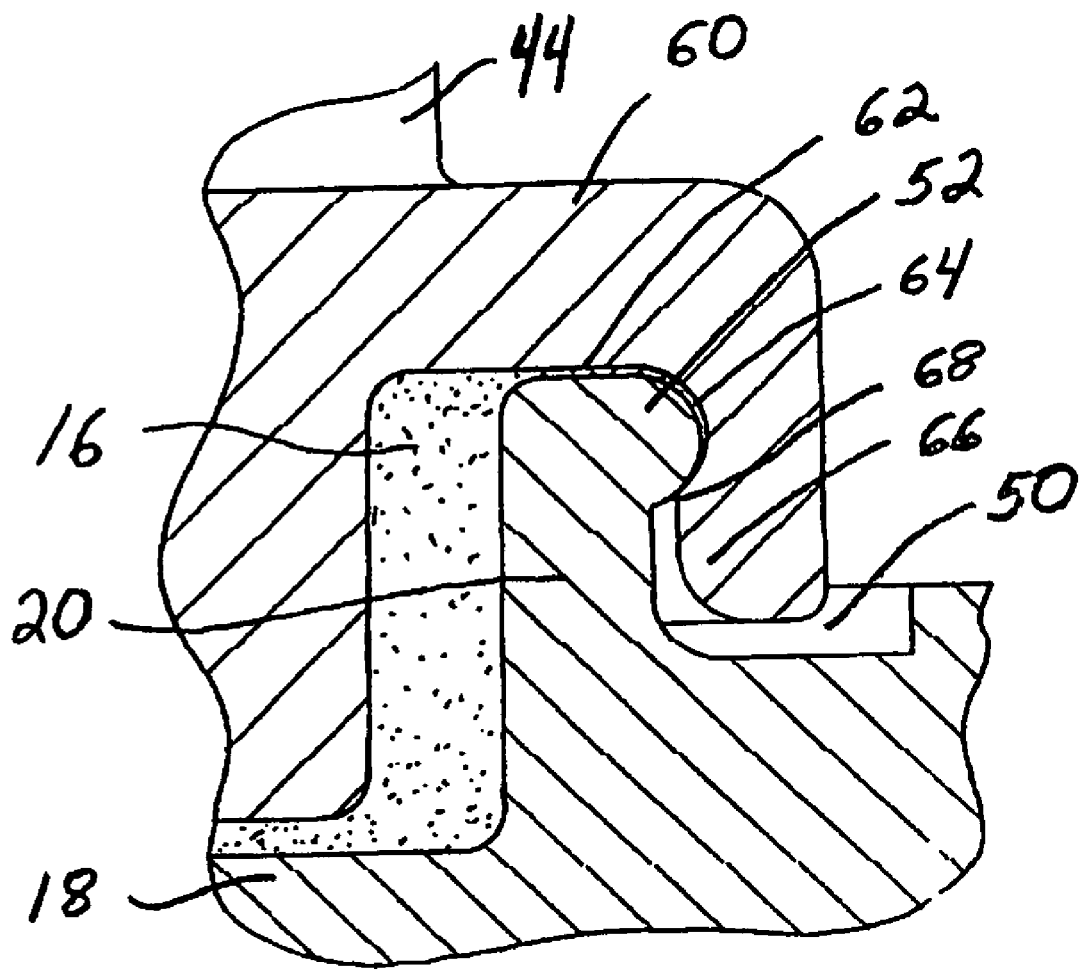
FIG. 3 is an enlarged view of the encircled cross-sectional area designated with the numeral 3 in FIG. 2.

The structures by which second part 14 engages first part 12 can be seen and understood more readily with reference to the enlarged, fragmentary cross-sectional view of FIG. 3.

First part 12 defines an annular channel 50 radially outward from wall 20. On the upper outer edge of cylindrical wall 20, a ring-like rounded lip 52 projects outwardly from wall 20 around the entire periphery thereof.

Second part 14 has an annular outer rim 60 at the base of gear 44. Rim 60 defines an annular channel 62 adapted, arranged and sized to receive the open end of wall 20, including lip 52 thereof such that cover 42 extends into the space defined by wall 20 when first and second parts 12 and 14 are assembled. At an outer edge of channel 62, rim 60 further defines an annular, curved recess 64 slightly larger than lip 52. A thickened end 66 of rim 60 axially outward from recess 64 is of greater diameter than wall 20, but of narrower diameter than lip 52 so that lip 52 and end 66 overlap radially. Recess 64 is slightly larger than lip 52 and curved to define a space between recess 64 and lip 52. Under axial force in opposite directions, an edge 68 of rim 60 engages an outer surface of lip 52 in a substantially continuous annular line of engagement having minimal radial extent.

Figure 2:
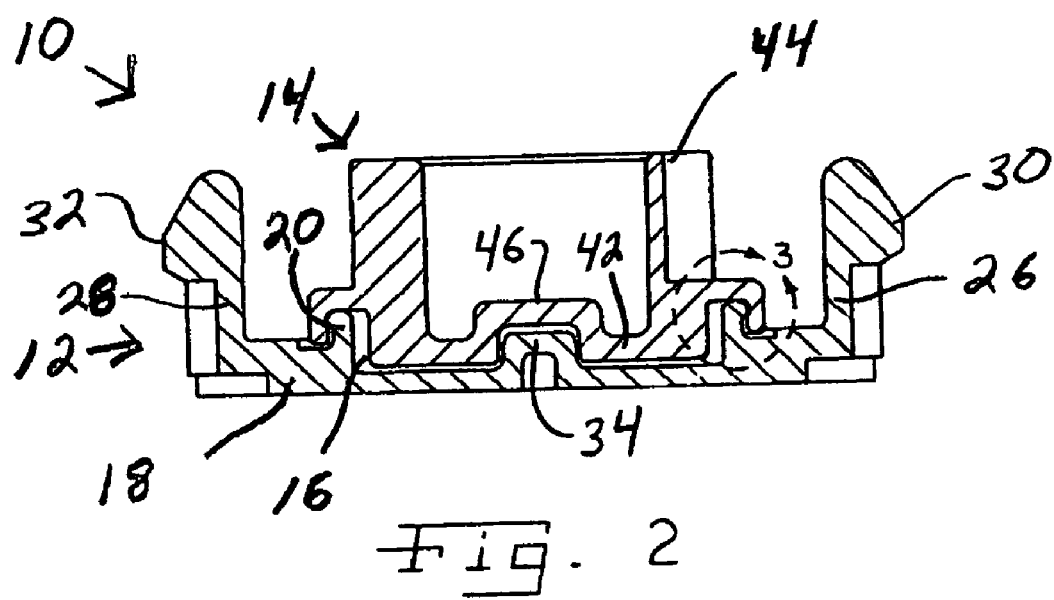
FIG. 2 is a cross-sectional view of the damper shown in FIG. 1, taken along line 2—2 of FIG. 1.

As can be seen in FIGS. 2 and 3, first part 12 and second part 14 interrelate with each other when assembled to define a space for containing damping fluid 16. Dimensional tolerances of each component are controlled so as to define a fixed volume space therebetween when assembled. During assembly, a prescribed volume of damping fluid 16 is placed within cylindrical wall 20. Second part 14 is located with respect to first part 12 such that rim 60 engages an outer portion of lip 52. Confronting surfaces, such as lip 52 and enlarged end 66 are rounded to facilitate each sliding past the other during assembly.

Compressive force is applied against first part 12 and second part 14 to create the snap inter-engagement of rim 60 with wall 20. Lip 52 slides past the outer edge of rim 60, with each deflecting slightly until lip 52 is located in recess 64. As cover 42 is forced into the spaced defined within wall 20, damping fluid 16 is compressed and caused to flow throughout the space defined between first part 12 and second part 14. Damping fluid 16 is dispersed throughout the space, displacing air and completely filling the volume remaining between first and second parts 12 and 14 within wall 20 and channel 62.

When compressive force is released, compressed damping fluid 16 causes relatively outward force between first part 12 and second part 14. A substantially continuous, radially narrow annular line of engagement occurs between edge 68 and lip 52 to define an outer limit or seal for the migration of damping fluid 16. However, as can be seen from the cross-sectional views in FIGS. 2 and 3, other than the radially limited engagement line in the region of edge 68 of end 66 against lip 52, second part 14 and first part 12 are otherwise separated by a layer of damping fluid 16. Second part 14 rotates with respect to first part 12, with gear 44 thereof in engagement with a gear on the device (not shown) upon which damper 10 operates. Gear 44 is supported fully by cover 42, reducing the potential for overall gear deflection as compared with gears centrally mounted on a shaft of a damper rotor. Further, with each tooth of gear 44 being integral with cover 42 at one end, the potential for deflection of individual teeth of gear 44 is reduced. Gear 44 is stable, promoting properly aligned gear mesh with a device upon which damper 10 is installed.

Damper 10 includes two structural components that are readily manufacturable by molding techniques and easily assembled with minimal steps. The continuous snap feature about the periphery of the chamber defined between first part 12 and second part 14 creates a continuous rotating seal for containing damping fluid 16. The reactionary force from the damping fluid applies a constant, controlled pressure between the confronting surfaces of the first and second parts. Consistent torque performance of damper 10 is thereby achieved. Most of the confronting surfaces of first part 12 and second part 14 are separated by a layer of damping fluid 16, functioning as a lubricant. Thus, damper 10 functions smoothly, without sticking or binding and for many cycles of operation with minimal or no significant wear.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A damper comprising:
  a first part having a base and a wall extending outwardly from said base and defining a space, said wall having an open end;
  a second part rotatably secured to said first part and closing said open end, said second part including a cover and a rim at the periphery thereof, said rim extending radially outward beyond said wall;
  said wall including a radially extending rounded lip extending continuously around said wall, and said rim defining a curved recess for receiving said lip, said rim defining a continuous edge along said recess fix engaging said lip; and
  damping fluid compressed in the space between said first and second parts including between said rounded lip and said curved recess and contained therein by a seal formed by said edge against said lip.

2. The damper of claim 1, said cover having a gear on an outer surface thereof.

3. The damper of claim 2, said cover extending into said space defined by said wall.

4. The damper of claim 3, said base defining a groove outwardly of said wall, and said rim extending into said groove.

5. The damper of claim 4, said base defining a protrusion into the space defined by said wall, and said cover having a dome for receiving said protrusion.

6. The damper of claim 1, said cover extending into said spare defined by said wall.

7. The damper of claim 1, said base defining a groove outwardly of said wall and said rim extending into said groove.

8. The damper of claim 1, said base defining a protrusion into said space defined by said wall, and said cover having a dome for receiving said protrusion.

9. The damper of claim 1, wherein said damper is a gear damper, said second part further including a gear integral with said cover, said rim extending over and outwardly beyond said wall open end, said rim having a thickened end of a diameter greater than a diameter of said wall and less than a diameter of said lip, said thickened end disposed outwardly of said wall between said lip and said base, said first and second parts defining a continuous sliding seal of limited radial width, and wherein said damping fluid is a continuous layer contained between said first and second parts and radially constrained by said seal.

10. The gear damper of claim 9, said seal formed by axial separation of said first and second parts.

11. The gear damper of claim 10, said damping fluid being compressed between said first and second parts and apply force against said first and second parts for creating said seal.

12. The gear damper of claim 9, said damping fluid being compressed between said first and second parts and applying force against said first and second parts for creating said seal.

* * * * *